US006968461B1

(12) United States Patent
Lucas et al.

(10) Patent No.: US 6,968,461 B1
(45) Date of Patent: Nov. 22, 2005

(54) PROVIDING BREAK POINTS IN A MALWARE SCANNING OPERATION

(75) Inventors: Martin James Lucas, Aylesbury (GB); Daniel Joseph Wolff, Aylesbury (GB)

(73) Assignee: Networks Associates Technology, Inc., Santa Clara, CA (US)

( * ) Notice: Subject to any disclaimer, the term of this patent is extended or adjusted under 35 U.S.C. 154(b) by 973 days.

(21) Appl. No.: 09/678,010

(22) Filed: Oct. 3, 2000

(51) Int. Cl.[7] ........................ G06F 11/30; G06F 12/14; H04L 9/00; H04L 9/32

(52) U.S. Cl. ...................... 713/200; 713/188; 713/189; 713/187; 713/201; 713/202; 714/38

(58) Field of Search ............................... 713/100, 104, 713/200, 201, 188, 189, 187, 202; 714/38; 395/183, 186

(56) References Cited

U.S. PATENT DOCUMENTS 5,649,095 A * 7/1997 Cozza ......................... 714/39
5,826,013 A * 10/1998 Nachenberg ................ 713/200
5,832,208 A * 11/1998 Chen et al. ................ 713/201
5,960,170 A * 9/1999 Chen et al. .................... 714/38
5,999,723 A * 12/1999 Nachenberg ................. 703/22
6,240,447 B1 * 5/2001 Banga et al. ............... 709/217
6,357,008 B1 * 3/2002 Nachenberg ................ 713/200

OTHER PUBLICATIONS

Adleman, "An Abstract Theory of Computer Viruses", 1990, Advances in Cryplography- CRYPTO'88, pp 354-374.*

* cited by examiner

*Primary Examiner*—Ayaz Sheikh
*Assistant Examiner*—Shin-Hon Chen
(74) *Attorney, Agent, or Firm*—Zilka-Kotab, PC; Christopher J. Hamaty

(57) ABSTRACT

A computer virus scanning system is described in which during the scanning operation a measurement value indicative of the amount of data processing performed is calculated and this measurement value used to trigger breaks in the virus scanning operation. The triggered breaks can be used to perform a determination as to whether or not the virus scanning operations should be early terminated. One possibility is to measure the total size of the data processed during the virus scanning operation and calculate a ratio of this compared to the size of the computer file being virus scanned. If this calculated ratio exceeds a predetermined threshold, then virus scanning may be terminated. Another possibility is to associate a complexity value with each of a plurality of tests applied in the virus scanning operation. A total for these complexity values may be used to trigger the breaks and also to trigger early termination upon exceeding of respective threshold levels.

30 Claims, 8 Drawing Sheets

PROVIDING BREAK POINTS IN A MALWARE SCANNING OPERATION

BACKGROUND OF THE INVENTION

1. Field of the Invention

This invention relates to the field of data processing systems. More particularly, this invention relates to the field of the detection of computer viruses within computer files.

2. Description of the Prior Art

It is known to provide anti-virus systems that are able to detect computer viruses within a computer file. A problem with such known anti-virus systems is that computer virus writers may seek to target the anti-virus system itself and exploit features of that anti-virus system in order to harm the computer system upon which the anti-virus system is running. As an example of this, it is known to produce files that are highly compressed versions of much larger files knowing that an anti-virus system will have to decompress the file in order that it can scan for viruses within it. If the decompressed file size is sufficiently large, then the amount of data requiring to be handled, even though it may contain very little information, may itself cause problems to an anti-virus system, e.g. it may exceed the amount of physical memory available requiring the extensive use of virtual memory thus significantly impacting the performance of the system conducting the anti-virus scan or in some cases even exceeding the amount of virtual memory available.

It is known to provide anti-virus scanning systems that will time-out a virus scanning operation if the system clock indicates that a predetermined duration for that virus scanning operation has been exceeded. However, such an approach has the disadvantage that a slow or stressed/overloaded (possibly deliberately) computer system may inappropriately terminate a virus scanning operation using such a simple expired time approach.

Measures that allow reliable breaks to be triggered during a virus scanning operation whilst reducing their own vulnerabilities are strongly advantageous.

SUMMARY OF THE INVENTION

Viewed from one aspect the present invention provides a method of detecting computer viruses within a computer file, said method comprising the steps of:

- receiving a request to scan a computer file for computer viruses;
- initiating a virus scanning operation upon said computer file;
- calculating during said virus scanning operation a measurement value indicative of an amount of data processing performed during said virus scanning operation;
- comparing during said virus scanning said measurement value with a threshold value; and
- triggering a break in said virus operation is said measurement value exceeds said threshold value.

The invention operates by applying real time virus scanning operation metrics to the data processing being performed in order that this can be monitored and used to trigger appropriate breaks within the virus scanning operation. Using metrics associated with the amount of data processing performed provides a reliable way of resisting attacks on the anti-virus system by overloading it, whilst not exposing the system to vulnerabilities due to inappropriate breaks and possible early terminations of virus scanning operations that are not in themselves justified by an excessive amount of data processing being involved in the virus scanning operation.

Whilst the breaks triggered within the virus scanning operation could be used for various purposes, such as providing general feedback to a monitoring process, the invention is particularly useful in circumstances in which a break is used to perform a determination of whether the virus scanning operation should be terminated prior to completion.

One preferred technique for implementing the above is to monitor the size of the data processed during the data processing operation. If an excessive quantity of data is being processed during the virus scanning operation of a single computer file, then this indicates that it may be appropriate to terminate that virus scanning operation prior to its completion.

An additional degree of sophistication is provided when the size of the data processed in the virus scanning operation is compared with the size of the computer file being scanned when determining whether the amount of data being processed is excessive. It may be that a large computer file being scanned legitimately requires a large amount of data to be processed during its scanning operation and accordingly should not be early terminated. Conversely, the type of highly compressed computer file deliberately intended to cause an overflow in the amount of data being processed would yield a much higher ratio in the amount of data being processed to the size of the computer file itself and so be distinguishable in a manner that its virus scanning may be properly early terminated.

Another possibility in obtaining a measurement value indicative of an amount of data processing being performed is to associate a complexity value with each of a plurality of tests that are applied to the computer file to check for particular computer viruses within that computer file. Some tests may be relatively quick and simple therefore having a low complexity value. Conversely, tests checking for a polymorphic virus or requiring heuristic analysis may require a much greater amount of data processing to complete and accordingly have a high complexity value. Summing the complexity values of the tests applied to a computer file and then comparing this with a threshold to trigger a break is a reliable way of regularly triggering breaks in a manner properly related to the amount of data processing being performed as discussed above.

Viewed from another aspect the present invention provides apparatus for detecting computer viruses within a computer file, said apparatus comprising:

- a receiver operable to receive a request to scan a computer file for computer viruses;
- initiating logic operable to initiate a virus scanning operation upon said computer file;
- calculating logic operable to calculate during said virus scanning operation a measurement value indicative of an amount of data processing performed during said virus scanning operation;
- comparing logic operable during said virus scanning to compare said measurement value with a threshold value; and
- triggering logic operable to trigger a break in said virus operation is said measurement value exceeds said threshold value.

Viewed from a further aspect the invention provides a computer program product carrying a computer program for controlling a computer to detect computer viruses within a computer file, said computer program comprising:

receiver code operable to receive a request to scan a computer file for computer viruses;

initiating code operable to initiate a virus scanning operation upon said computer file;

calculating code operable to calculate during said virus scanning operation a measurement value indicative of an amount of data processing performed during said virus scanning operation;

comparing code operable during said virus scanning to compare said measurement value with a threshold value; and triggering code operable to trigger a break in said virus operation is said measurement value exceeds said threshold value.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
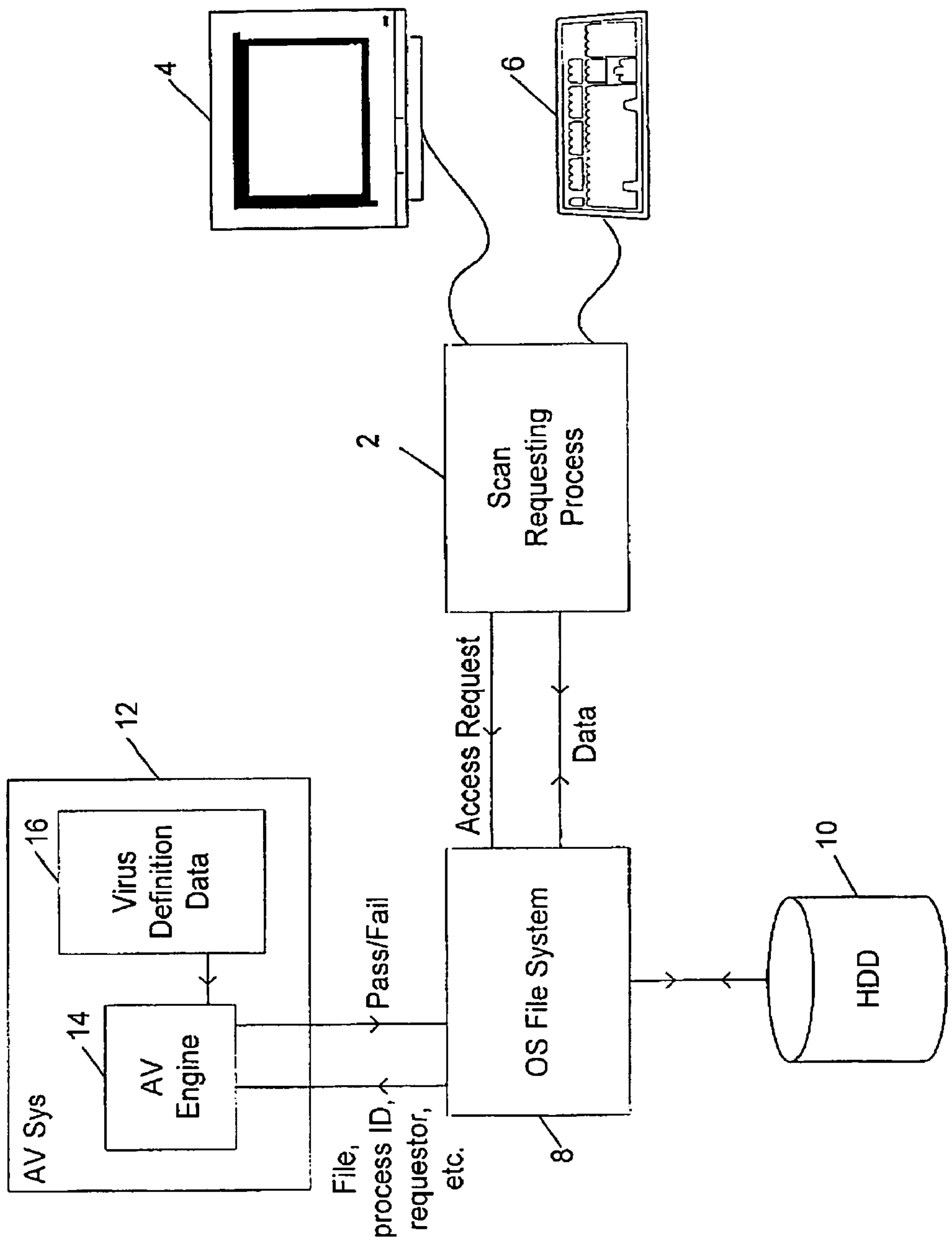
FIG. 1 schematically illustrates an on-access anti-virus file scanning system.

FIG. 1 illustrates an on-access anti-virus system. A scan requesting process 2, which may be an application program interacting with a user via a display 4 and a keyboard 6, issues an access request to an operating system file system 8. This operating system file system 8, prior to servicing the access request from an associated hard disk drive 10, generates a scan request that is passed to an anti-virus system 12 together with the file concerned and further associated data. Within the anti-virus system 12, an anti-virus engine 14 working with virus definition data 16 serves to apply a plurality of tests for different known viruses and virus like behaviour to the computer file in order to detect the presence of a computer virus within that computer file. A pass or fail signal is passed back to the operating system file system 8 and used to determine whether or not the access request via the scan requesting process 2 is serviced.

Figure 2:
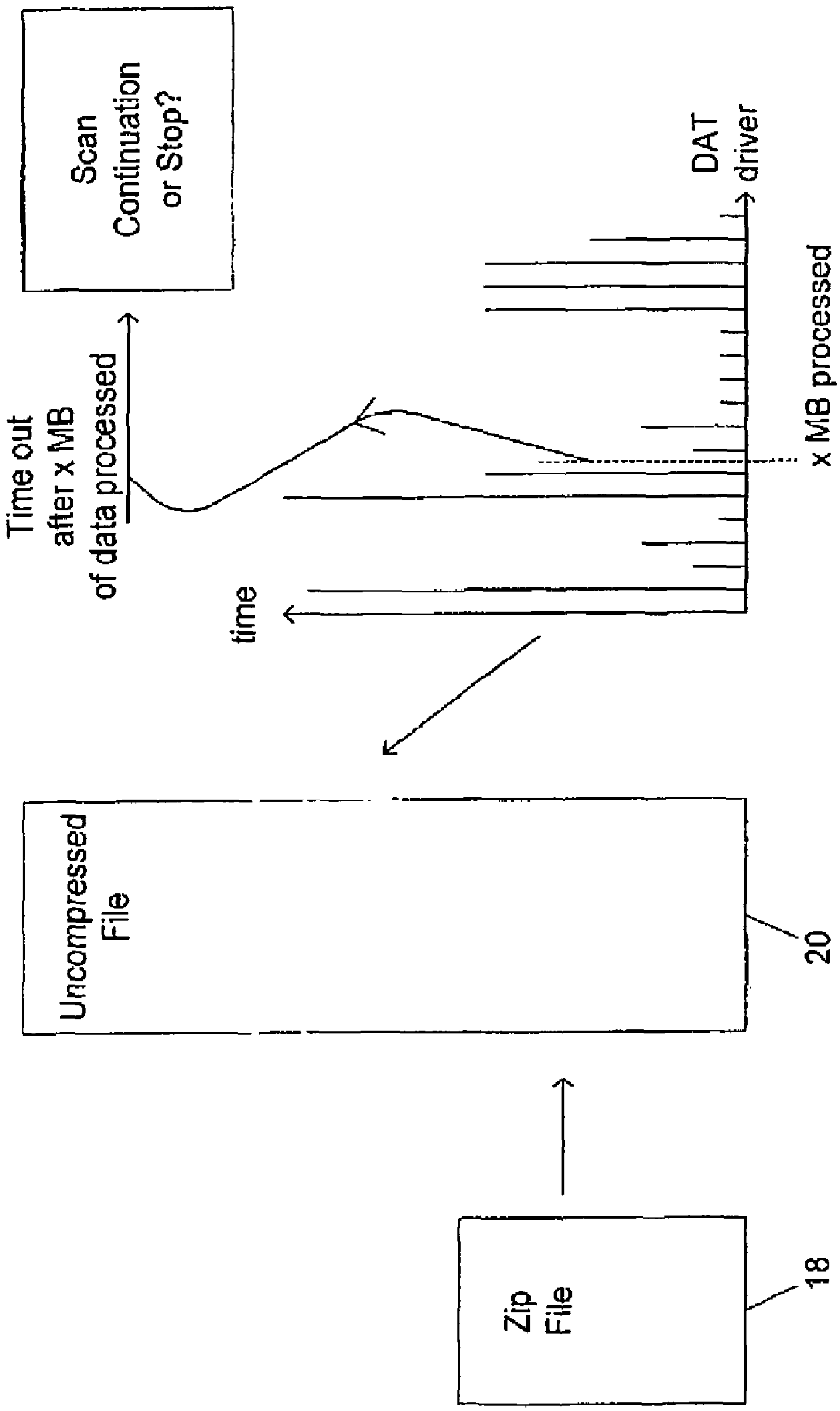
FIG. 2 schematically illustrates the decompression of a computer file prior to scanning and the subsequent monitoring of the size of data processed.

FIG. 2 illustrates virus scanning operation when access is made to a compressed computer file 18. In order that this compressed computer file 18 can be properly checked it is decompressed into an uncompressed file form 20 and then a sequence of tests corresponding to separate DAT driver files within the virus definition data 16 are applied to the uncompressed data. In practice the anti-virus system 12 requests a portion of the compressed file 18 to be decompressed and then applies the tests to that decompressed portion. If further portions still requiring checking, then more of the compressed file is decompressed and checked.

As illustrated in FIG. 2, the different tests applied corresponding to different DAT drivers have different associated times taken for their completion. They also require differing amounts of data to be processed, e.g. differing amounts of data to be written to and read from memory or non-volatile storage. During the virus scanning operation, a tally is kept of the size of the data that has been processed so far in the virus scanning operation and when this exceeds a threshold level, a break in the virus scanning operation is triggered and a check is made as to whether or not the virus scanning operation should continue.

Figure 3:
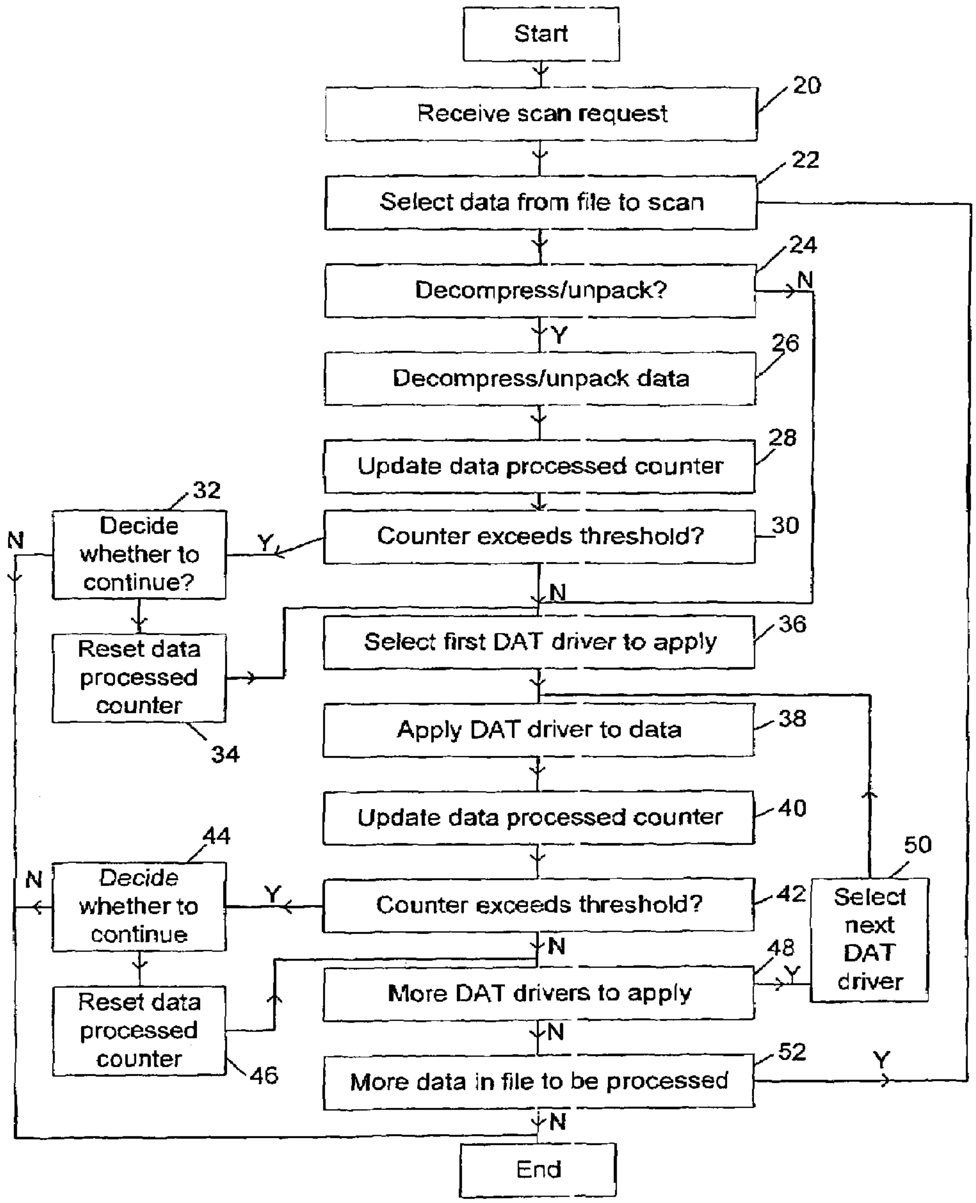
FIG. 3 is a flow diagram illustrating the operation of the system in accordance with FIG. 2.

FIG. 3 is a flow diagram illustrating the operation of FIG. 2. At step 20, a scan request is received by the anti-virus system 12. At step 22, a portion of the computer file to be scanned is selected for initial processing.

At step 24, a determination is made as to whether or not the portion of data recovered from the computer file being scanned requires decompressing or unpacking prior to testing. If the data does require decompressing or unpacking, then this is performed at step 26. Step 28 updates a data process counter to take account of the decompressing or unpacking operation of step 26, and step 30 then compares this data processed counter value with a threshold value to see if it has been exceeded.

If the threshold has been exceeded, then processing proceeds to step 32 at which a determination is made as to whether or not the virus scanning operation should continue. If the virus scanning operation is not to continue, then it is terminated. If the virus scanning operation is to continue, then the data processed counter used to trigger the breaks within the virus scanning operation is reset at step 34 and processing is returned to step 36.

Step 36 selects the first DAT driver (i.e. computer virus test) to be applied to the portion of the computer file being processed. Step 24, if it determines that no decompression or unpacking is required, passes control directly to step 36.

Step 38 applies the selected-test to the portion of the computer file-being processed and step 40 then updates the counter of the amount of data processed in a similar manner to step 28.

Step 42 determines whether or not a threshold amount of data processed has been exceeded and if so passes processing to step 44 at which a determination is made as to whether or not to continue the virus scanning operation. If the virus scanning operation is not to continue, then the virus scanning operation is terminated. If virus scanning is to continue, then processing proceeds to step 46 at which the data processed size counter (break initiating counter) is reset and processing is returned to step 48. If the threshold value tested in step 42 was not exceeded, then step 42 passes control directly to step 48.

At step 48 a determination is made as to whether or not any more tests need to be applied to the portion of the computer file currently under test. If more tests are needed, then the next of these is selected at step 50. If no more tests are needed for that portion of the computer file, then processing proceeds to step 52 at which a determination is made as to whether or not any further portions of the computer file under test need to be scanned for computer viruses. If no further portions of the computer file under test do need to be scanned, then processing terminates. If further portions of the computer file under test do need to be subject to computer virus scanning, then processing returns to step 22 at which the next portion of the computer file for testing is selected.

Figure 4:
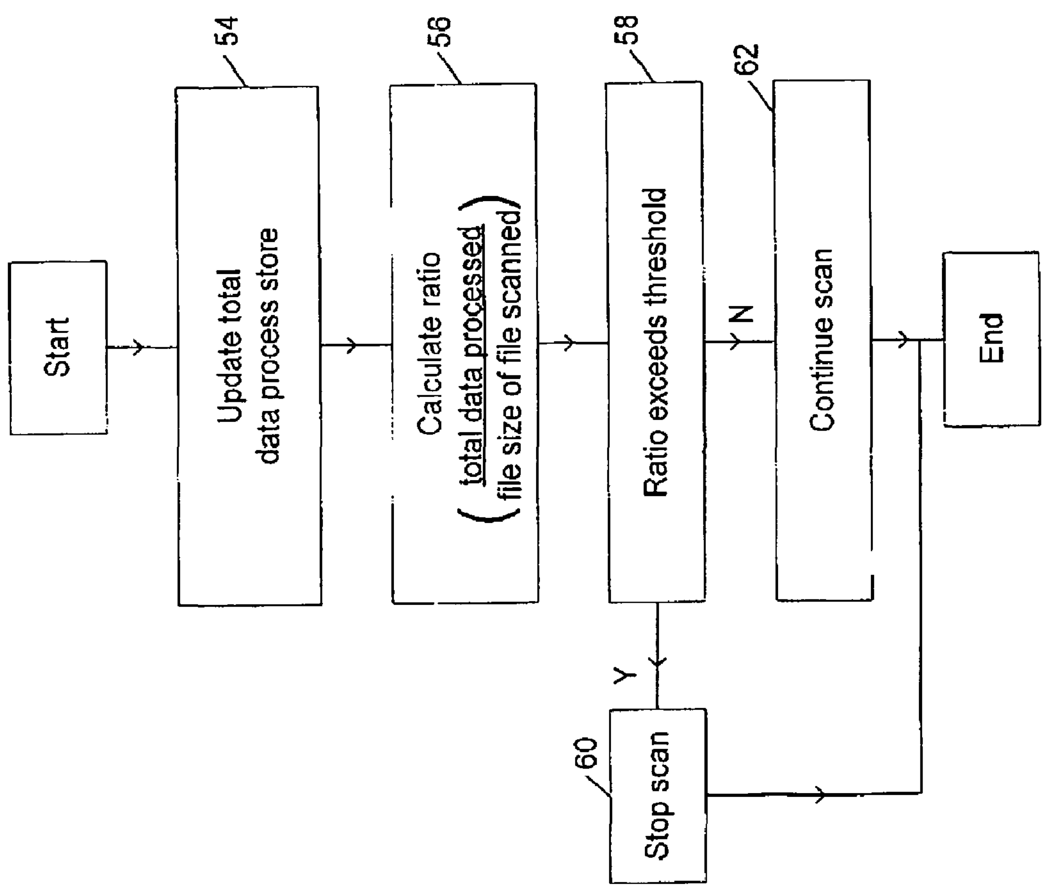
FIG. 4 is a flow diagram illustrating an example of a determination of whether or not to early terminate a virus scanning operation based upon the size of data processed.

FIG. 4 is a flow diagram illustrating the type of processing that may be performed in steps 32 or 44 of FIG. 3 in determining whether or not processing should be continued or early terminated. At step 54 a total size value for the complete amount of data processed so far in analysing the computer program under test (as compared to the amount of data that triggered the break) is updated. At step 56, a ratio of this total data processed so far compared to the file size of the computer file being scanned is calculated. The calculated ratio is compared with a threshold ratio value at step 58 and if the threshold ratio value is exceeded, then the result of the determination is to stop the scan at step 60. Conversely, if the threshold ratio is not exceeded at step 58, then step 62 sets the result of the determination to be to continue the scan operation.

Figure 5:
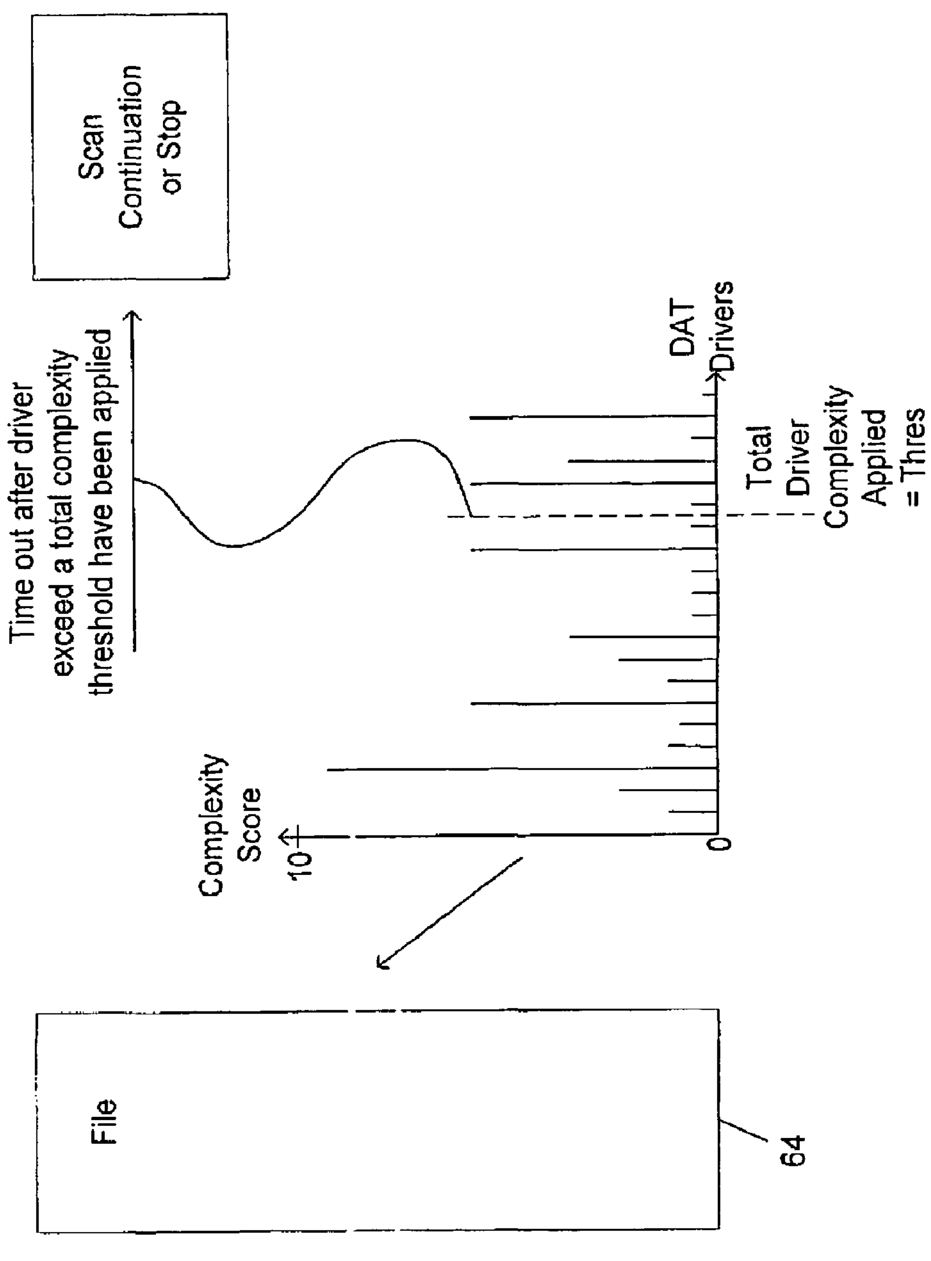
FIG. 5 schematically illustrates a computer file being virus scanned and breaks provided within that operation based upon a sum of complexity values of applied tests.

FIG. 5 schematically illustrates an alternative embodiment of the invention in which a complexity value scoring scheme is used to trigger breaks within the scanning operation. A computer file 64 to be virus scanned is in this case in its native form and does not require decompressing or unpacking. It will be appreciated that the complexity scoring approach could also work with compressed or packed files in providing a break triggering mechanism.

A portion of the computer file 64 to be tested is then subject to the processing associated with a series of DAT drivers within the computer virus definition data 16 of the anti-virus system 12. Each of the DAT drivers (tests) has an associated complexity value (e.g. a simple test could have a complexity value of 1 whilst a complicated heuristic test could have a complexity value of 10). The complexity values represent the amount of data processing typically required to conduct that test. A running count/tally of the total of the complexity values for the tests applied up to that point is kept and when this exceeds a threshold value a break in the virus scanning operation is triggered and a determination made as to whether or not virus scanning operation should proceed further.

Figure 6:
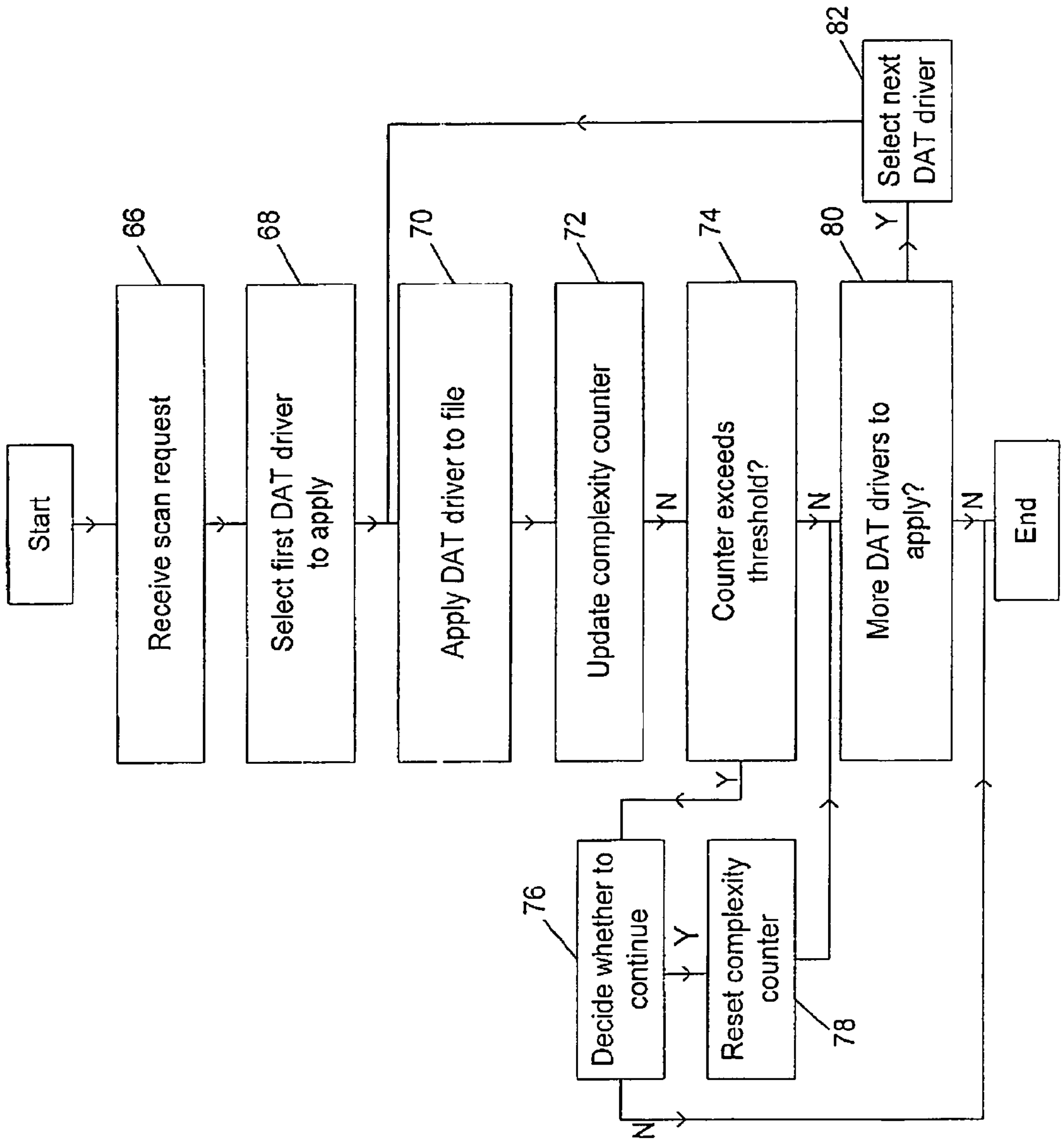
FIG. 6 is a flow diagram illustrating the operation of the system in accordance with FIG. 5.

FIG. 6 is a flow diagram illustrating the operation of the system of FIG. 5 in which the decompression and unpacking processes have been removed. At step 66, a request to scan a computer file is received. Step 68 selects the first DAT driver to be applied to a first portion of the computer file 64. At step 70 the DAT driver selected is applied. At step 72 a complexity counter value is updated to reflect the total of the complexity values of the DAT driver tests applied up to that point. Step 74 tests whether the complexity value counter has exceeded a threshold value. If the threshold value has been exceeded, then step 76 determines whether or not the virus scanning operation should continue. If the virus scanning operation should not continue, then it is terminated. If the virus scanning operation should continue, then the break triggering counter is reset at step 78 and processing returned to step 80. If the threshold value tested at step 74 was not exceeded, then processing proceeds directly from step 74 to step 80.

Step 80 determines whether or not more DAT drivers should be applied to the portion of the computer file under test. If more DAT drivers are to be applied, then the next of these is selected at step 82 and processing is returned to step 70. If no more DAT drivers are to be applied then processing of that portion of the computer file concerned is terminated.

It will be appreciated that a further portion of the computer file may be selected for testing in accordance with the above technique as described in relation to the first example embodiment. In many practical instances, it is found that only a first portion of a computer file will in fact requiring testing.

Figure 7:
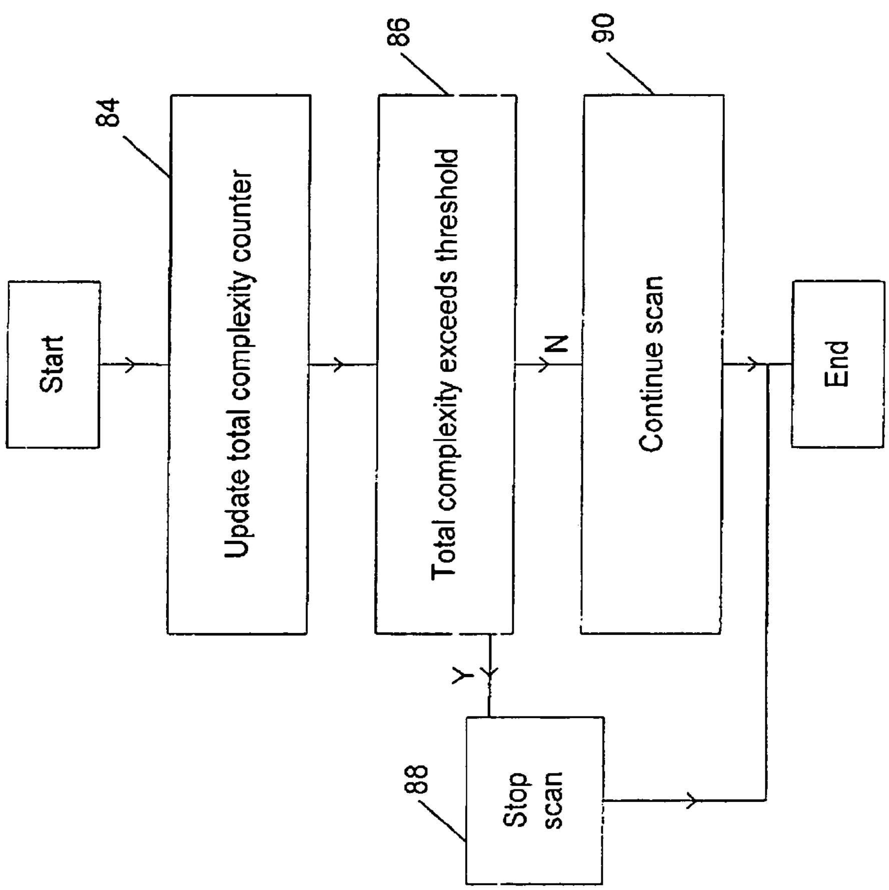
FIG. 7 is a flow diagram illustrating a determination of whether or not scanning should be early terminated in accordance with the system of FIG. 6.

FIG. 7 illustrates an example of the processing that may be involved in the determination of step 76. At step 84, an update is made to a counter recording the total complexity of all the DAT drivers applied to the computer file under test (not just those since the last break was triggered). Step 86 then compares this total complexity value with a termination threshold value. If the termination threshold value is exceeded, then the result of the test of step 76 is set to stop by step 88. Conversely, if the threshold value is not exceeded then the determination of step 76 is set to continue by step 90.

Figure 8:
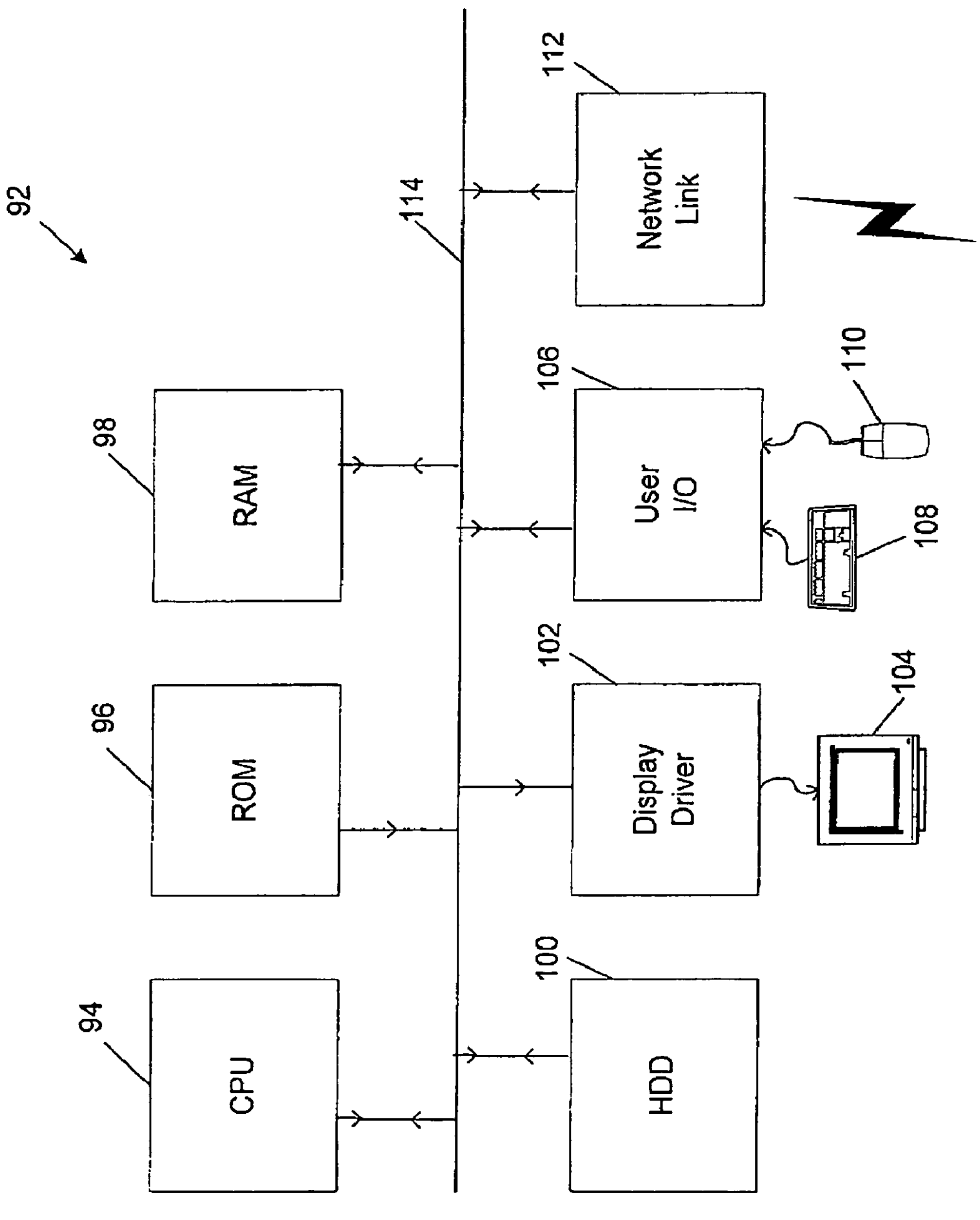
FIG. 8 is a schematic representation of a general purpose computer system for performing the techniques described above.

FIG. 8 schematically illustrates a general purpose computer system 92 of the type that may be used to implement the data processing described above. The general purpose computer 92 includes a central processing unit 94, a read only memory 96, a random access memory 98, a hard disk drive 100, a display driver 102 and a display 104, a user input/output unit 106 and a keyboard 108 and a mouse 110 and a network link unit 112 all linked by a common bus 114. The central processing unit 94 executes computer program instructions to provide computer code portions yielding the processing operations described above. The computer program instructions may be stored within one or more of the read only memory 96, the random access memory 98 or the hard disk drive 100. The computer program instructions may also be downloaded into the general purpose computer 92 via the network link unit 112. The computer program may be embodied as a computer program product distributed via a recording medium, such as a compact disk or a floppy disk drive, or may be downloaded from a remote source via a network link.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of detecting computer viruses within a computer file, said method composing the steps of:

receiving a request to scan a computer file for computer viruses;

initiating a virus scanning operation upon said computer file;

calculating during said virus scanning operation a measurement value indicative of an amount of data processing performed during said virus scanning operation, wherein the measurement value is based, at least in part, on at least one of a data size of the computer file and a complexity of tests of the virus scanning operation;

comparing during said virus scanning said measurement value with a threshold value; and triggering a break in said virus operation prior to completion of the tests to determine as to whether the computer file is infected, if said measurement value exceeds said threshold value to prevent overload of a virus scanner.

2. A method as claimed in claim 1, further comprising the step of, upon occurrence of said break, determining using said measurement value whether or not said virus scanning operation should be terminated prior to completion.

3. A method as claimed in claim 2, wherein said measurement value yields a processed data size value for data processed during said virus scanning operation and step of determining is responsive to both said processed data size value and a computer file size value for said computer file when determining whether or not said virus scanning operation should be terminated prior to completion.

4. A method as claimed in claim 3, wherein said step of determining calculates a measurement ratio of said processed data size value to said computer file size value and compares this with a termination size threshold ratio such that said virus scanning is terminated if said measurement ratio exceeds said termination size threshold ratio.

5. A method is claimed in claim 2, wherein said virus scanning operation applies a plurality of the tests to said computer file, each test having a complexity value indicative of an amount of data processing associated with that test, said measurement value being a sum of complexity values for tests applied during said virus scanning operation and said step of determining terminating said virus scanning operation prior to completion if said sum of complexity values exceeds a termination complexity threshold value.

6. A method as claimed in claim 1, wherein said measurement value yields a processed data size value for data processed during said virus scanning operation.

7. A method as claimed in claim 1, wherein said amount of data processing performed includes data processing involved in any decompression of said computer file required for said virus scanning operation.

8. A method as claimed in claim 1, wherein said amount of data processing performed includes data processing involved in any unpacking of said computer file required for said virus scanning operation.

9. A method as claimed in claim 1, wherein said virus scanning operation applies a plurality of the tests to said computer file, each test having a complexity value indicative of an amount of data processing associated with that test and said measurement value is a sum of complexity values for tests applied during said virus scanning operation.

10. A method as claimed in claim 9, wherein said plurality of test applied are selected in dependence upon said computer file.

11. Apparatus for detecting computer viruses within a computer file, said apparatus comprising:

- a receiver operable to receive a request to scan a computer file for computer viruses;
- initiating logic operable to initiate a virus scanning operation upon said computer file;
- calculating logic operable to calculate during said virus scanning operation a measurement value indicative of an amount of data processing performed during said virus scanning operation, wherein the measurement value is based, at least in part, on at least one of a data size of the computer file and a complexity of tests of the virus scanning operation;
- comparing logic operable during said virus scanning to compare said measurement value with a threshold value; and
- triggering logic operable to trigger a break in said virus operation prior to completion of the tests to determine as to whether the computer file is infected, if said measurement value exceeds said threshold value to prevent overload of a virus scanner.

12. Apparatus as claimed in claim 11, wherein, upon occurrence of said break, determining logic operates using said measurement value to determine whether or not said virus scanning operation should be terminated prior to completion.

13. Apparatus as claimed in claim 12, wherein said measurement value yields a processed data size value for data processed during said virus scanning operation.

14. Apparatus as claimed in claim 12, wherein said measurement value yields a processed data size value for data processed during said virus scanning operation and said determining logic is responsive to both said processed data size value and a computer file size value for said computer file when determining whether or not said virus scanning operation should be terminated prior to completion.

15. Apparatus as claimed in claim 14, wherein said determining logic is operable to calculate a measurement ratio of said processed data size value to said computer file size value and compare this with a termination size threshold ratio such that said virus scanning is terminated if said measurement ratio exceeds said termination size threshold ratio.

16. Apparatus as claimed in claim 12, wherein said virus scanning operation applies a plurality of the tests to said computer file, each test having a complexity value indicative of an amount of data processing associated with that test, said measurement value being a sum of complexity values for tests applied during said virus scanning operation and said step of determining terminating said virus scanning operation prior to completion if said sum of complexity values exceeds a termination complexity threshold value.

17. Apparatus as claimed in claim 11, wherein said amount of data processing performed includes data processing involved in any decompression of said computer file required for said virus scanning operation.

18. Apparatus as claimed in claim 11, wherein said amount of data processing performed includes data processing involved in any unpacking of said computer file required for said virus scanning operation.

19. Apparatus as claimed in claim 11, wherein said virus scanning operation applies a plurality of the tests to said computer file, each test having a complexity value indicative of an amount of data processing associated with that test and said measurement value is a sum of complexity values for tests applied during said virus scanning operation.

20. Apparatus as claimed in claim 19, wherein said plurality of tests applied are selected in dependence upon said computer file.

21. A computer program product carrying a computer program for controlling a computer to detect computer viruses within a computer file, said computer program comprising:

- receiver code operable to receive a request to scan a computer file for computer viruses;
- initiating code operable to initiate a virus scanning operation upon said computer file;
- calculating code operable to calculate during said virus scanning operation a measurement value indicative of an amount of data processing performed during said virus scanning operation, wherein the measurement value is based, at least in part, on at least one of a data size of the computer file and a complexity of tests of the virus scanning operation;
- comparing code operable during said virus scanning to compare said measurement value with a threshold value; and
- triggering code operable to trigger a break in said virus operation prior to completion of the tests to determine as to whether the computer file is infected, if said measurement value exceeds said threshold value to prevent overload of a virus scanner.

22. A computer program product as claimed in claim 21, wherein, upon occurrence of said break, determining code operates using said measurement value to determine whether or not said virus scanning operation should be terminated prior to completion.

23. A computer program product as claimed in claim 22, wherein said measurement value yields a processed data size value for data processed during said virus scanning operation.

24. A computer program product as claimed in claim 22, wherein said measurement value yields a processed data size value for data processed during said virus scanning operation and said determining code is responsive to both said processed data size value and a computer file size value for said computer file when determining whether or not said virus scanning operation should be terminated prior to completion.

25. A computer program product as claimed in claim 24, wherein said determining code is operable to calculate a measurement ratio of said processed data size value to said computer file size value and compare this with a termination size threshold ratio such that said virus scanning is terminated if said measurement ratio exceeds said termination size threshold ratio.

26. A computer program product as claimed in 22, wherein said virus scanning operation applies a plurality of the tests to said computer file, each test having complexity value indicative of an amount of data processing associated with that test, said measurement value being a sum of complexity values for tests applied during said virus scanning operation and said step of determining terminating said virus scanning operation prior to completion if said sum of complexity values exceeds a termination complexity threshold value.

27. A computer program product as claimed in claim 21, wherein said amount of data processing performed includes data processing involved in any decompression of said computer file required for said virus scanning operation.

28. A computer program product as claimed in claim 21, wherein said amount of data processing performed includes data processing involved in any unpacking of said computer file required for said virus scanning operation.

29. A computer program product as claimed in claim 21, wherein said virus scanning operation applies a plurality of the tests to said computer file, each test having complexity value indicative of an amount of data processing associated with that test and said measurement value is a sum of complexity values for tests applied during said virus scanning operation.

30. A computer program product as claimed in claim 29, wherein said plurality of the tests applied are selected in dependence upon said computer file.

* * * * *